(12) United States Patent
Edson et al.

(10) Patent No.: US 9,716,905 B2
(45) Date of Patent: Jul. 25, 2017

(54) SELECTIVE CONTENT DELIVERY OVER DIVERSE NETWORKS

(71) Applicant: Verizon Patent and Licensing Inc., Arlington, VA (US)

(72) Inventors: Mark T. Edson, Lake Stevens, WA (US); Johannes P. Schmidt, Los Altos Hills, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/822,113

(22) Filed: Aug. 10, 2015

(65) Prior Publication Data

US 2017/0048562 A1    Feb. 16, 2017

(51) Int. Cl.
| | |
|---|---|
| H04N 7/173 | (2011.01) |
| H04N 21/2381 | (2011.01) |
| H04L 29/08 | (2006.01) |
| H04N 21/482 | (2011.01) |
| H04N 21/231 | (2011.01) |
| H04N 21/4363 | (2011.01) |
| H04N 21/643 | (2011.01) |
| H04L 29/06 | (2006.01) |

(52) U.S. Cl.
CPC ......... *H04N 21/2381* (2013.01); *H04L 67/02* (2013.01); *H04L 67/06* (2013.01); *H04L 69/18* (2013.01); *H04N 21/23109* (2013.01); *H04N 21/43637* (2013.01); *H04N 21/4825* (2013.01); *H04N 21/64322* (2013.01)

(58) Field of Classification Search
CPC ........... H04N 21/2743; H04N 7/17318; H04N 21/2223; H04N 21/25866; H04N 21/25891

USPC .......................................................... 725/116
See application file for complete search history.

(56) References Cited

U.S. PATENT DOCUMENTS

| | | | | |
|---|---|---|---|---|
| 2012/0311094 A1* | 12/2012 | Biderman | .............. | H04N 5/783 709/219 |
| 2014/0281009 A1* | 9/2014 | Moorthy | ........... | G06F 17/30017 709/231 |
| 2015/0089557 A1* | 3/2015 | Busse | .............. | H04N 21/23439 725/95 |
| 2015/0113101 A1* | 4/2015 | Kim | ........................ | H04L 65/60 709/219 |
| 2015/0201042 A1* | 7/2015 | Shah | ....................... | H04L 65/60 709/219 |
| 2015/0365450 A1* | 12/2015 | Gaunt | ................. | H04L 65/4084 709/231 |

* cited by examiner

*Primary Examiner* — Kyu Chae (57) ABSTRACT

Techniques described herein may allow for the flexible selection, and use of, various streaming techniques when a particular streaming technique is specified or required by a content player application. For example, some content player applications require the use of Hypertext Transfer Protocol Live Streaming ("HLS"). In some situations, other techniques, such as Moving Pictures Experts Group Dynamic Streaming over Hypertext Transfer Protocol ("MPEG-DASH"), may be preferable. The selection may be based on current operating conditions, such as whether a device, running the content player application, is using a WiFi or a cellular network. A local web proxy may be used to allow a content player application to request files using HLS, and may obtain the requested files using another streaming technique (e.g., MPEG-DASH). The obtained files may be transpackaged and provided to the content player application for presentation to a user.

20 Claims, 8 Drawing Sheets

| Local TS file name | Remote TS file name | fMP4 file name |
|---|---|---|
| 127.0.0.1:1234/vid1/10-1.ts | cdn.foobar.com/v1/10-001.ts | cdn.foobar.com/v1/1.fmp4 |
| 127.0.0.1:1234/vid1/10-2.ts | cdn.foobar.com/v1/10-002.ts | cdn.foobar.com/v1/2.fmp4 |
| 127.0.0.1:1234/vid1/10-3.ts | cdn.foobar.com/v1/10-003.ts | cdn.foobar.com/v1/3.fmp4 |
| 127.0.0.1:1234/vid1/10-4.ts | cdn.foobar.com/v1/10-004.ts | cdn.foobar.com/v1/4.fmp4 |

SELECTIVE CONTENT DELIVERY OVER DIVERSE NETWORKS

BACKGROUND

Various techniques are available for the live streaming of content, such as video content. Some such techniques include mechanisms to provide variable bitrate content, whereby the bitrate of content may be dynamically adjusted based on certain conditions, such as the bandwidth capabilities of a receiving user device, the load or congestion of one or more networks via which the user device receives the content, or other conditions. Some existing techniques to provide variable bitrate streaming content include Hypertext Transfer Protocol ("HTTP") live streaming ("HLS") and Moving Pictures Experts Group ("MPEG") Dynamic Adaptive Streaming over HTTP ("DASH"), sometimes referred to as "MPEG-DASH," or "MPD." HLS and MPD (and/or other techniques) may have certain advantages and/or disadvantages in relation to one another, so a content provider may desire to deliver content using a particular technique (e.g., HLS as opposed to MPD, or vice versa). However, hardware and/or software constraints may be in place, whereby a content provider is forced to use a particular technique, even though another technique may be desirable. For example, some video players may require the use of HLS, even in situations where a content provider may desire to instead use MPD or another technique.

DETAILED DESCRIPTION OF PREFERRED EMBODIMENTS

The following detailed description refers to the accompanying drawings. The same reference numbers in different drawings may identify the same or similar elements.

Figure 1:
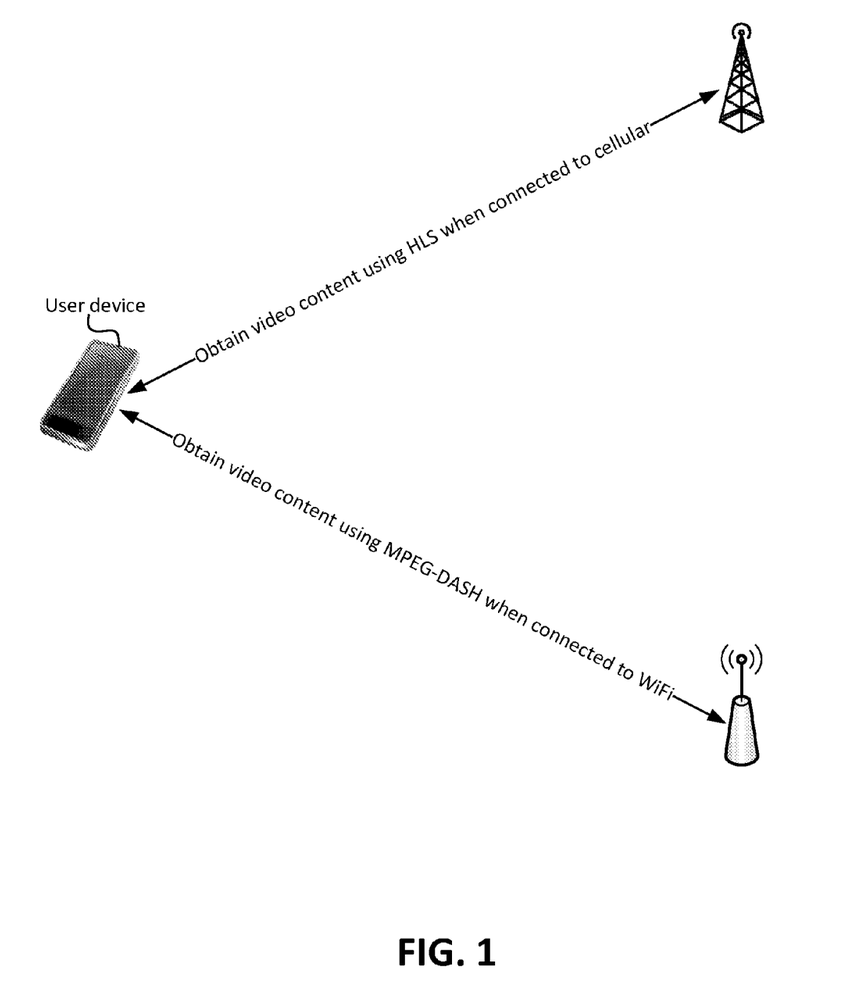
FIG. 1 illustrates an example overview of implementations described herein, in which content is delivered to a user device using different techniques, based on a type of wireless network to which the user device is connected.

Some implementations, described herein, may provide for the selective delivery of content (e.g., streaming content, such as streaming video content), based on a type of wireless network to which a user device, that receives the content, is connected. For example, as shown in FIG. 1, when connected to a cellular network (e.g., a Long-Term Evolution ("LTE") network), a user device may obtain content using an HLS technique. When connected to another type of network, such as a WiFi network (e.g., a network that operates based on an Institute of Electrical and Electronics Engineers Institute of Electrical and Electronics Engineers ("IEEE") 802.11-based standard), the user device may obtain content using an MPD technique.

Using MPD techniques may be desirable to a content provider associated with the content (e.g., when the user device is connected to a WiFi network), but software constraints on the user device may require the use of HLS. As described herein, when obtaining content using a technique other than HLS (e.g., MPD), content playback software on the user device (and/or other software that enforces the HLS requirement) may request the content using HLS techniques, an HTTP proxy on the user device may intercept the request and obtain the content using MPD techniques (or another technique), may "transpackage" the obtained content according to HLS, and may provide the transpackaged content to the content playback software. As used herein, the term "transpackage" may refer to the act of changing, or repackaging, the file format or encapsulation of content (e.g., streaming audio/video content). In some implementations, transpackaging may be a separate concept from transcoding (e.g., modifying the encoding technique of content). In this manner, the content playback software is still able to enforce the requirement that the content be delivered using HLS, while the content provider gains flexibility in the manner in which content is provided to user devices.

Figure 2:
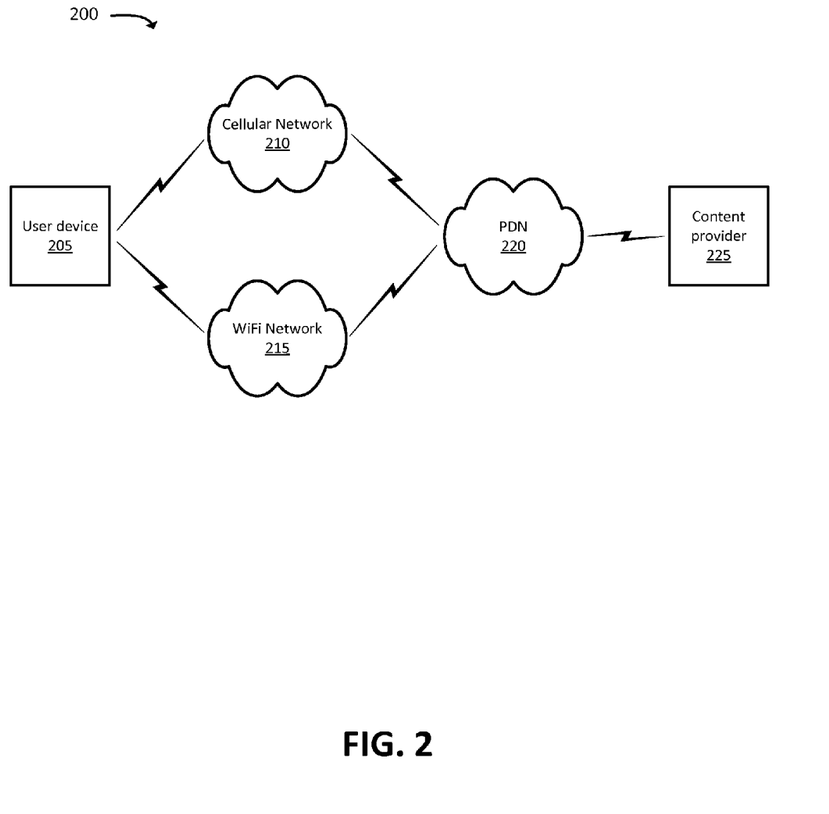
FIG. 2 illustrates an example environment, in which systems and/or methods, described herein, may be implemented.

FIG. 2 illustrates an example environment 200, in which systems and/or methods described herein may be implemented. As shown in FIG. 2, environment 200 may include one or more user devices 205, cellular network 210, WiFi network 215, packet data network ("PDN") 220, and content provider 225.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via PDN 220 (and/or another network).

User device 205 may include any computation and communication device that is capable of communicating with one or more networks (e.g., PDN 220, via cellular network 210 and/or WiFi network 215). For example, user device 205 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of computation and communication device. User device 205 may include logic and/or hardware circuitry to communicate via one or more "short range" wireless protocols (e.g., via WiFi network 215), such as WiFi, Bluetooth, Near Field Communications ("NFC"), ZigBee (e.g., based on an IEEE 802.15.4-based standard), or the like. User device 205 may also include logic and/or hardware circuitry to communicate via a wireless telecommunications protocol (e.g., via cellular network 210), such as LTE, Third Generation Partnership Project ("3GPP") Third Generation ("3G"), Code Division Multiple Access ("CDMA") 2000 1x, and/or another wireless telecommunications protocol.

As described below, user device 205 may include logic and/or hardware circuitry to obtain content (e.g., streaming content) in a manner that is different from constraints required by software running on user device 205 (e.g., content playback software), and transpackage the content according to such constraints (thereby fulfilling the constraints, while also enhancing the available options for obtaining the content). For example, content playback software may require that streaming video content be obtained using HLS. In some implementations, streaming video content may be obtained using a different technique (such as MPD), and the obtained content may be transpackaged according to HLS and provided to the content playback software, thereby satisfying the requirements of the content playback software.

Cellular network 210 and WiFi network 215 may each correspond to one or more radio access networks ("RANs"), via which user device 205 may access PDN 220 (or other networks or devices). Cellular network 210 may generally represent one or more networks that operate at a set of licensed frequencies or frequency bands (e.g., frequencies that have been licensed by a governmental agency), such as frequencies that correspond to LTE, 3GPP Second Generation ("2G"), 3GPP 3G, CDMA2000 1x, or the like. While referred to herein as a "cellular" network, it is to be understood that cellular network 210 may, in some implementations, include types of networks that do not necessarily operate using "cells," but operate at licensed frequencies, and/or are networks provided by wireless telecommunications providers. In some implementations, cellular network 210 may correspond to "shared" frequencies, in which the same frequency band is licensed or available to multiple different entities (e.g., multiple different wireless telecommunications providers). In some implementations, cellular network 210 may be referred to as a wireless wide area network ("WWAN").

Cellular network 210 may include one or more network devices that receive, process, and/or transmit traffic, such as calls, audio, video, text, and/or other data, destined for and/or received from user device 205. For example, cellular network 210 may include one or more base stations that operate at one or more frequency bands including, but not limited to, LTE, 1x, 2G, and/or 3G frequency bands. Cellular network 210 may also include, or be communicatively coupled to, a core network and/or one or more other devices that transport traffic between a base station and PDN 220. For example, cellular network 210 may include a serving gateway ("SGW"), an Ethernet backhaul link, a PDN gateway ("PGW"), and/or one or more other devices.

WiFi network 215 may generally represent one or more networks that operate at a set of unlicensed frequencies or frequency bands (e.g., frequency bands that have not been licensed by a governmental agency, or for which such licensing may not be necessary). For example, WiFi network 215 may operate at frequency bands including, but not limited to, 2.4 GHz and/or 5 GHz frequency bands, and may utilize IEEE 802.11-based protocols. While referred to as a "WiFi" network, in some implementations, WiFi network 215 may utilize one or more communications techniques in addition to, or in lieu of, WiFi techniques. For example, in some implementations, WiFi network 215 may utilize Bluetooth, NFC, ZigBee, and/or one or more other communication techniques. In some implementations, the term "WiFi network" may generally refer to a type of network that is not provided by a wireless telecommunications service provider. In some implementations, cellular network 210 may be referred to as a wireless local area network ("WLAN").

WiFi network 215 may include one or more network devices that receive, process, and/or transmit traffic, such as calls, audio, video, text, and/or other data, destined for and/or received from user device 205. For example, WiFi network 215 may include one or more WLAN access points, such as a WiFi access point. As mentioned above, in situations where WiFi network 215 includes one or more other types of technologies, WiFi network 215 may include access points or other types of suitable devices, according to the other types of technologies, via which user device 205 may wirelessly connect to WiFi network 215. WiFi network 215 may also include, or be communicatively coupled to, an Internet service provider's ("ISP's") network and/or one or more other devices that transport traffic between a WLAN access point and PDN 220. For example, WiFi network 215 may include an Internet gateway, which communicatively couples a WLAN access point to the ISP's network.

PDN 220 may include one or more wired and/or wireless networks. For example, PDN 220 may include an Internet Protocol ("IP")-based PDN, a wide area network ("WAN") such as the Internet, a private enterprise network, and/or one or more other networks. User device 205 may connect, via cellular network 210, WiFi network 215, and/or PDN 220, to data servers, application servers, other user devices 205, content provider 225, and/or to other servers or applications that are coupled to PDN 220. PDN 220 may be connected to one or more other networks, such as a public switched telephone network ("PSTN"), a public land mobile network ("PLMN"), and/or another network.

Content provider 225 may include one or more devices (e.g., a single physical device or a distributed set of devices) that provide content (e.g., streaming content) to user device 205. For example, as described below, content provider 225 may provide playlists, such as HLS playlists and/or MPD playlists, which may be used by user device 205 to obtain streaming content. Content provider 225 may receive requests from user device 205 for content (e.g., content specified in a particular playlist), and may provide the content to user device 205 in a streaming manner. In some implementations, content provider 225 may be, or may be communicatively coupled to, a content delivery network ("CDN"), which may cache content at "edges" of networks, in order to reduce the load within a network (e.g., within an Internet service provider's network).

Figure 3:
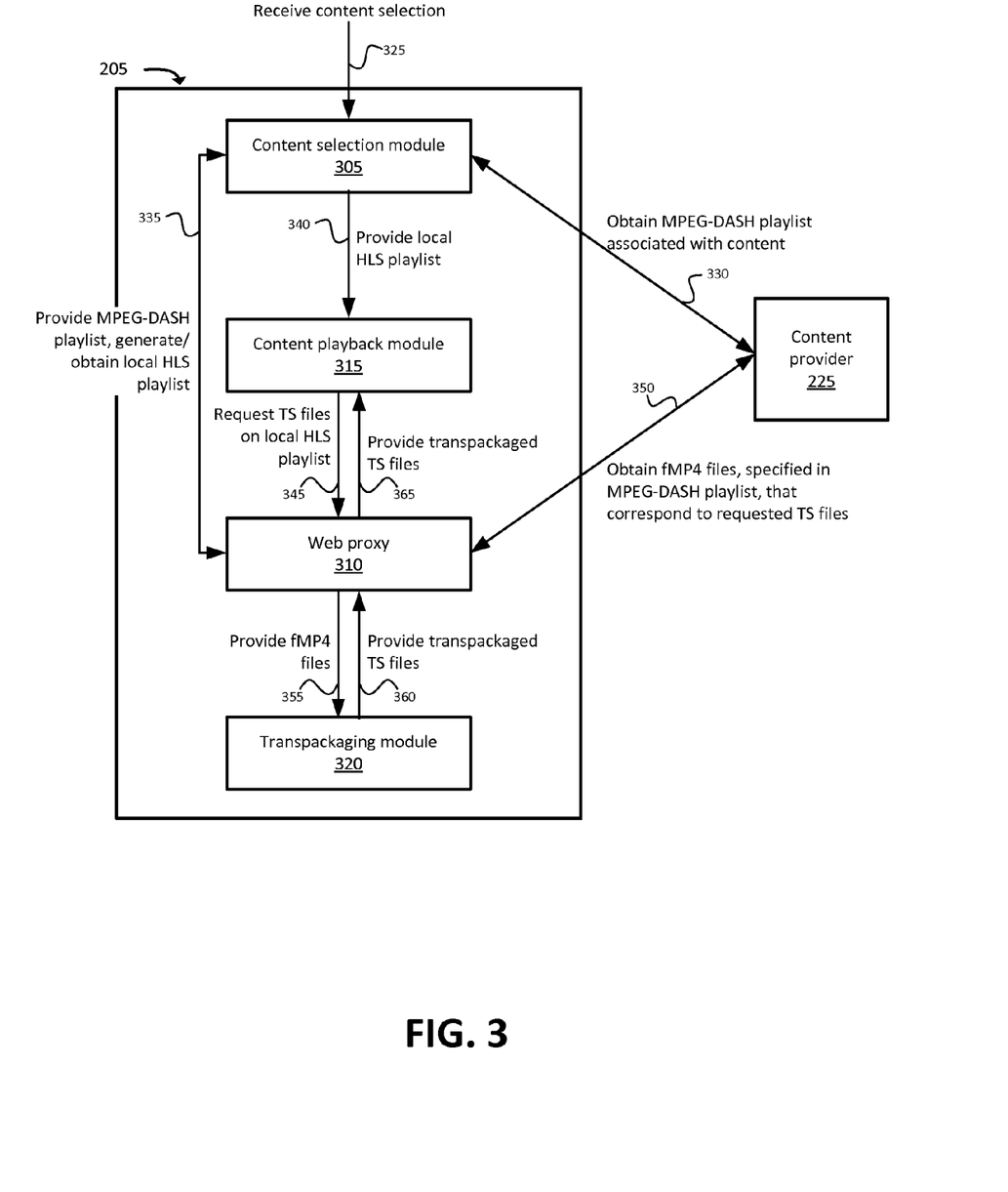
FIG. 3 illustrates example components of a user device, and an example signal flow relating to obtaining and transpackaging content using an MPD technique.

FIG. 3 illustrates example functional components of user device 205, as well as example signals that relate to the obtaining of content using one streaming technique (i.e., MPD, in this example), and the transpackaging of the obtained content and delivery to a content playback application according to another streaming technique (i.e., HLS, in this example). In the example shown in FIG. 3, assume that user device 205 is connected to WiFi network 215. As shown, user device 205 may include content selection module 305, web proxy 310, content playback module 315, and transpackaging module 320. In some implementations, user device 205 may include additional, fewer, different, and/or differently arranged components than shown in FIG. 3. The components shown in FIG. 3 may be implemented as hardware circuitry, software logic, or a combination of hardware and software.

Content selection module 305 may present (e.g., as a graphical user interface ("GUI") via a display device associated with user device 205), the option to select one or more content items. For example, content selection module 305 may present a GUI with a set of thumbnails, icons, links, and/or other selectable visual representations that each correspond to a particular content item (e.g., a streaming video content item). Content selection module 305 may correspond to, for example, an application (or "app") installed on user device 205 by an end user of user device 205, a vendor of user device 205, or a manufacturer of user device 205. As shown, for instance, content selection module 305 may receive (at 325) a selection of a particular item of content. The selection may correspond to, for example, a selection by a user on a touchscreen of user device 205 of a particular content item, a voice command by the user, an instruction received from another device (e.g., from a wearable device in communication with user device 205), and/or some other form of selection.

Content selection module 305 may also receive and/or store information regarding a uniform resource locator ("URL"), and/or some other identifier, associated with a provider of the content (e.g., a URL associated with the content, hosted by content provider 225). Upon selection (at 325) of the content, content selection module 305 may obtain (at 330) one or more playlists, associated with the content, from content provider 225. The playlists may include an MPD playlist and/or an HLS playlist.

The playlists may include listings of files (and URLs or other identifiers associated with the files) that correspond to the content. For example, assuming that the selected content is a movie that is two hours in length, a particular playlist may include a listing of 720 ten-second files. The listing of files may include URLs and/or other identifiers, which may be used to obtain the files while streaming the content. In some implementations, the playlists (obtained at 330) may include multiple playlists that each correspond to different bitrates (e.g., one playlist may correspond to a "low" bitrate, another playlist may correspond to a "medium" bitrate, and yet another playlist may correspond to a "high" bitrate). The playlist(s) (obtained at 330) may include one or more MPD playlists and, in some implementations, may include one or more HLS playlists.

In some implementations, content selection module 305 may receive and/or store different URLs (or other identifiers) for different playlists associated with a particular content item, and may determine which playlist(s) to retrieve, for the content item, based on which type of network user device 205 is connected to. In some implementations, content selection module 305 may determine whether user device 205 is connected to cellular network 210 or WiFi network 215 (and/or may receive a notification from another component of user device 205, indicating the type of network to which user device 205 is connected). In the example shown in FIG. 3, content selection module 305 may have determined that user device 205 is connected to WiFi network 215. Based on determining that user device 205 is connected to WiFi network 215, content selection module 305 may request the MPD playlist from content provider 225. In other situations (e.g., as described below with respect to FIGS. 4 and 5), content selection module 305 may request an HLS playlist from content provider 225 (e.g., when user device 205 is connected to cellular network 210). In some implementations, content provider 225 may provide HLS playlists and MPD playlists (e.g., content selection module 305 may not specifically request a particular type of playlist) when content selection module 305 requests (at 330) playlists for the selected content.

Web proxy 310 may be an HTTP proxy, or another type of web proxy, installed at user device 205. As described below, web proxy 310 may receive and handle requests (e.g., HTTP requests) directed at a particular address associated with the HTTP proxy (e.g., "http://127.0.0.1:[port]," where "http://127.0.0.1" is an IP address that user device 205 may use to refer to itself, and where "[port]" represents a port number through which web proxy 310 can be reached by applications, running on user device 205, invoking the IP address and port number). In some implementations, the address associated with the HTTP proxy may include another identifier of user device 205 itself, such as the logical name "localhost" (e.g., in lieu of the IP address "127.0.0.1"). Generally speaking, from the standpoint of other applications running on user device 205, web proxy 310 may appear as a separate device that can be reached through HTTP messaging (or through some other type of network protocol in lieu of, or in addition to, HTTP).

Once the playlist(s) is/are obtained (at 330), content selection module 305 may provide (at 335) an MPD playlist to web proxy 310. In some implementations, content selection module 305 (and/or web proxy 310) may generate a "local" HLS playlist, based on the MPD playlist. For example, content selection module 305 may parse the MPD playlist (which may be in an extended markup language ("XML") format) in order to identify files (including durations of the files) associated with the selected content, and may generate an HLS playlist (referred to herein as a "local" HLS playlist), in which the files correspond to the files identified in the MPD playlist. The files, listed in the HLS playlist, may include links to web proxy 310. In some implementations, content selection module 305 may generate or maintain a mapping of the files, specified in the MPD playlist, to the files specified in the local HLS playlist.

As an example, consider an example MPD playlist, which includes the following XML code:

<SegmentURL media="cdn.foobar.com/v1/1.fmp4" mediaRange="0-2999"/>
<SegmentURL media="cdn.foobar.com/v1/2.fmp4" mediaRange="3000-5999"/>
<SegmentURL media="cdn.foobar.com/v1/3.fmp4" mediaRange="6000-8999"/>

In this example playlist, "cdn.foobar.com/v1/" may be a URL that corresponds to a directory (e.g., a directory stored by content provider 225), in which files corresponding to a particular content item are stored. The content files, in this example, may be "1.fmp4," "2.fmp4," and "3.fmp4." The "mediaRange" tag may indicate a temporal location of a particular file, and may be expressed in milliseconds (or, in other implementations, another measure of time). For instance, the file "1.fmp4" may correspond to the first three seconds of the streaming content, the file "2.fmp4" may correspond to the next three seconds of the streaming content, and the file "3.fmp4" may correspond to the following three seconds after "2.fmp4." Thus, in this example, each of the three files has a duration of three seconds.

An example local HLS playlist, generated based on this MPD playlist, may include the following text:

```
#EXTINF:3.000,
http://127.0.0.1:1234/1.ts
#EXTINF:3.000,
http://127.0.0.1:1234/2.ts
#EXTINF:3.000,
http://127.0.0.1:1234/3.ts
```

In this example local HLS playlist, the "#EXTINF" tag may denote a duration of each file (e.g., in seconds or using another measure of time), and URL "http://127.0.0.1:1234" may refer to an IP address and port number associated with web proxy 310. The file names "1.ts," "2.ts," and "3.ts" may not refer to actual files; rather, these file names may be mapped to files "1.fmp4," "2.fmp4," and "3.fmp4" from the MPD playlist. As described below, when files "1.ts," "2.ts," and "3.ts" are requested by content playback module 315, web proxy 310 may instead obtain the corresponding files, of the MPD playlist, from content provider 225.

As shown in the above playlist examples, MPD playlists may refer to ".fmp4" files, or fragmented MPEG-4 files, while HLS playlists may refer to ".ts" files, or MPEG-2 transport stream files. In practice, different types of files may be used for the MPD playlists and/or the HLS playlists. For the sake of clarity of this disclosure, MPD playlists will continue to be described in the context of fragmented MPEG-4 ("fMP4") files, and HLS playlists will continue to be described in the context of MPEG-2 transport stream ("TS") files.

Once the local HLS playlist is generated and/or obtained by content selection module 305, content selection module 305 may provide (at 340) the local HLS playlist to content playback module 315. Content playback module 315 may, in some implementations, be a native video player application associated with user device 205 (e.g., a video player application that is installed by a vendor and/or manufacturer of user device 205). Content playback module 315 may enforce streaming content restrictions, such as by requiring the use of HLS for streaming video.

Content playback module 315 may request (at 345) files, specified in the local HLS playlist, using the URLs specified in the local HLS playlist. As mentioned above, the URLs may point to "virtual" files on web proxy 310. Web proxy 310 may determine a particular file, in the MPD playlist, that corresponds to a particular file (from the HLS playlist), requested (at 345) by content playback module 315. For example, as mentioned above, web proxy 310 may use a previously-generated mapping, between the MPD playlist and the local HLS playlist, to determine the corresponding file in the MPD playlist. Web proxy 310 may obtain (at 350) the determined files (e.g., fMP4 files specified in the MPD playlist) that correspond to the requested files (e.g., TS files specified in the HLS playlist). In this example, the files may be obtained via WiFi network 215.

Once obtained (at 350), the files may be provided (at 355) to transpackaging module 320. Transpackaging module 320 may be able to transpackage files from one transport format to another. For example, transpackaging module 320 may be capable of receiving an fMP4 file as input, and outputting a corresponding TS file. Transpackaging module 320 may use any known or conventional technique in order to perform the transpackaging. In some implementations, content transpackaging module may be capable of performing other modifications on content, such as transcoding (e.g., changing content from one codec to another codec). Transpackaging module 320 may provide (at 360) the transpackaged file to web proxy 310.

For example, assume that web proxy 310 obtains (at 350) an fMP4 file named "2.fmp4" from content provider 225, and provides (at 355) the file to transpackaging module 320. Transpackaging module 320 may transpackage the file into a TS file named "2.ts," and may provide (at 360) the TS file to web proxy 310.

Web proxy 310 may provide the transpackaged file ("2.ts") to content playback module 315. In some implementations, when providing the transpackaged file to content playback module 315, web proxy 310 may use HTTP signaling (e.g., to simulate an external HTTP-enabled web server in communication with content playback module 315). In this sense, from the viewpoint of content playback module 315, content playback module 315 has requested, and received, a video file in a manner commensurate with HLS content delivery techniques. Content playback module 315 may present (e.g., play) the received file, which may correspond to a portion of streaming video content (e.g., a portion of a movie, a portion of a television show, etc.).

Figure 4:
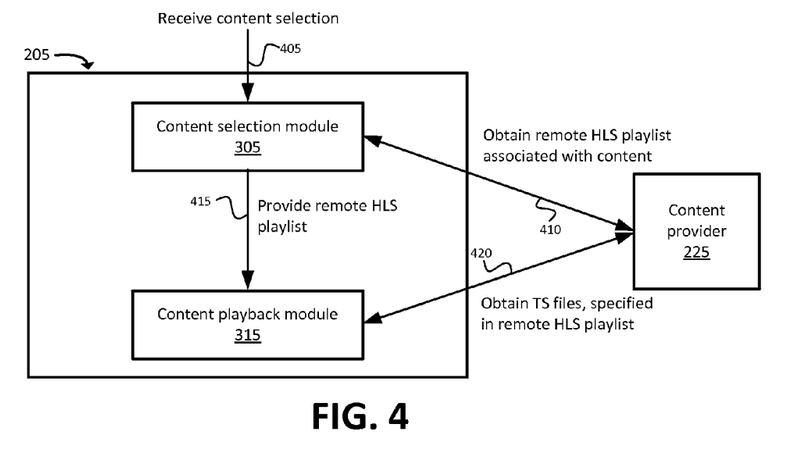
FIGS. 4 and 5 illustrate example components of a user device, and example signal flows relating to obtaining content using an HLS technique.

FIG. 4 illustrates example functional components of user device 205, as well as example signals that relate to the obtaining of content using HLS, when user device 205 is connected to cellular network 210. The components shown in FIG. 4 may be the same components, of user device 205, shown in FIG. 3.

As shown in FIG. 4, content selection module 305 may receive (at 405) a selection of content. The selection may correspond to, for example, a selection by a user of content that the user wishes to access. As mentioned above, assume that user device 205 is connected to cellular network 210, in the example shown in FIG. 4. Content selection module 305 may obtain (at 410), based on determining that user device 205 is connected to cellular network 210, a remote HLS playlist associated with the requested content from content provider 225. The remote HLS playlist may include URLs to files (e.g., TS files) located on content provider 225 (and/or another device).

Content selection module 305 may provide (at 415) the received remote HLS playlist to content playback module 315, which may obtain (at 420) files specified in the remote HLS playlist from content provider 225. Content playback module 315 may present (e.g., play) the received files, which may correspond to respective portions of streaming video content.

Figure 5:
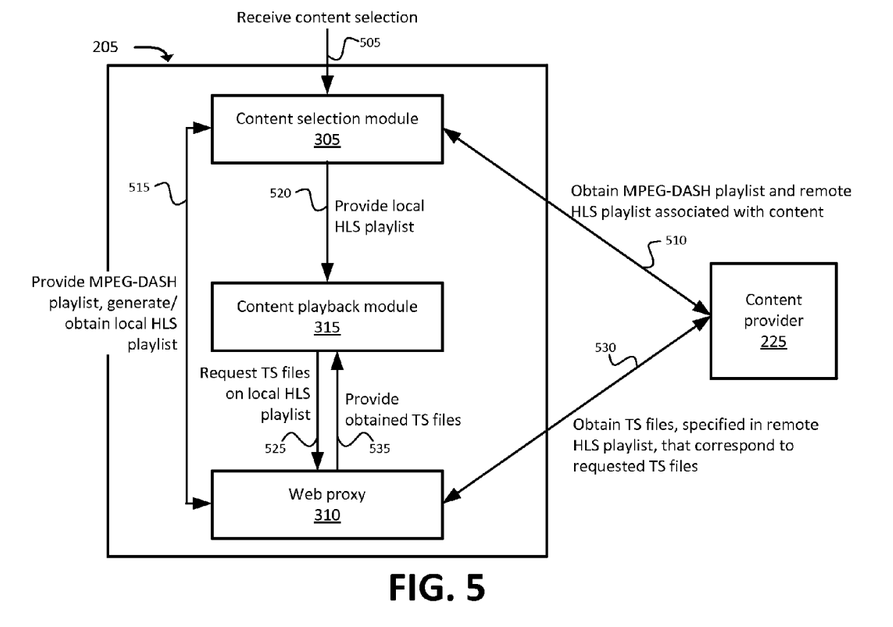

FIG. 5 also illustrates example functional components of user device 205, as well as another example of signals that relate to the obtaining of content using HLS, when user device 205 is connected to cellular network 210. The components shown in FIG. 5 may be the same components, of user device 205, shown in FIGS. 3 and 4.

As shown in FIG. 5, content selection module 305 may receive (at 505) a selection of content. The selection may correspond to, for example, a selection by a user of content that the user wishes to access. As mentioned above, assume that cellular network 210 is connected to cellular network 210, in the example shown in FIG. 5. Based on receiving the selection of the content, content selection module 305 may obtain (at 510) an MPD playlist associated with the content from content provider 225. In some implementations, content selection module 305 may also obtain an HLS playlist associated with the content from content provider 225.

As similarly described above with respect to FIG. 3, content selection module 305 (and/or web proxy 310) may generate (at 515) a "local" HLS playlist, based on the MPD playlist. In some implementations, content selection module 305 and/or web proxy 310 may maintain a mapping between files in the local HLS playlist and the MPD playlist. In some implementations, a further mapping between files in the remote HLS playlist (e.g., as may be obtained at 510) to the local HLS playlist and/or the MPD playlist may be maintained.

Figure 6:
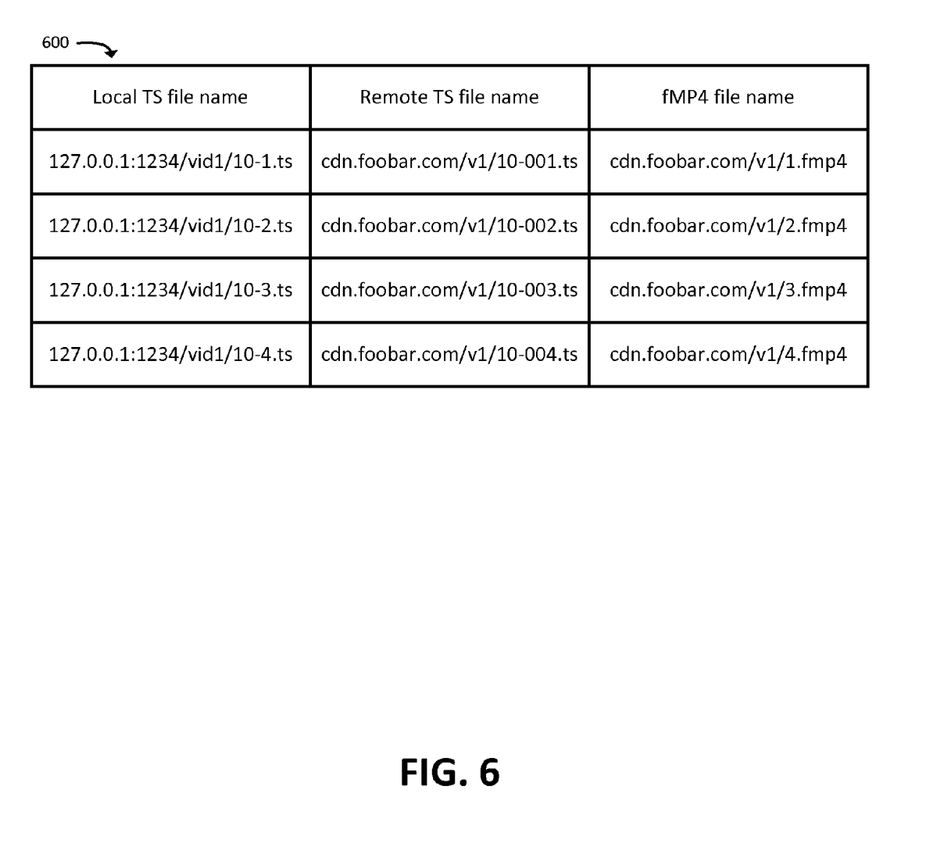
FIG. 6 illustrates an example data structure illustrating a mapping between a local HLS playlist, a remote HLS playlist, and an MPD playlist.

An example of such a mapping is shown in FIG. 6. Data structure 600 may include a mapping of files (e.g., including resource locator information, such as URLs for the files) from an MPD playlist (e.g., URLs in the "fMP4 file name" column), files from a remote HLS playlist (e.g., files in the "Remote TS file name" column), and files from a local HLS playlist (e.g., files in the "Local TS file name" column). Such a mapping may be useful in situations where the different playlists use different names to refer to the same segment of streaming content. For example, assume that web proxy 310 obtains an MPD playlist that includes the URL "cdn.foobar.com/v1/2.fmp4," and also obtains a remote HLS playlist that includes the URL "cdn.foobar.com/v1/10-002.ts" to refer to the same file (e.g., in instances where content provider 225 serves the files in these different formats). Web proxy 310 may generate a local HLS playlist based on the MPD playlist and/or the HLS playlist, and may generate the local URL "127.0.0.1:1234/vid1/10-2.ts" to refer to the same segment. The mapping (e.g., as shown in data structure 600) may be used by web proxy 310 when obtaining content requested by content playback module 315 (e.g., where the requests are made using local URLs), either by obtaining the content in a format associated with HLS (e.g., TS) or in a format associated with MPD (e.g., fMP4).

Returning to FIG. 5, content selection module 305 may provide (at 520) the generated local HLS playlist to content playback module 315. Content playback module 315 may request (at 525) files specified in the local HLS playlist (i.e., using URLs that point to "virtual" files associated with web proxy 310). Web proxy 310 may identify files, specified in the remote playlist, that correspond to the requested files. For example, web proxy 310 may use data structure 600 (and/or other mapping information) in order to identify a mapping between the files specified in the local playlist and the files specified in the remote playlist.

As may be apparent, the request, at 525 in FIG. 5, may be similar or identical to the request described above with signal 345 in FIG. 3. However, in responding to the request for a file from the local playlist, web proxy 310 may handle the request differently in different situations. For example, in FIG. 3, web proxy 310 may obtain (at 350) files specified in the MPD playlist, while in FIG. 5, web proxy 310 may obtain (at 530) files specified in the remote HLS playlist. Web proxy 310 may determine, or may receive information regarding (e.g., from content selection module 305), whether user device 205 is connected to cellular network 210 or WiFi network 215, and may obtain files (from content provider 225) in a manner that depends on which network user device 205 is connected to. For example, when connected to WiFi network 215 (as in the example of FIG. 3), web proxy 310 may obtain files from the MPD playlist, while when connected to cellular network 210 (as in the example of FIG. 5), web proxy 310 may obtain files from the remote HLS playlist.

Once web proxy 310 obtains (at 530) the files specified in the remote HLS playlist, that correspond to the requested files specified in the local HLS playlist, web proxy 310 may provide (at 535) the obtained files to content playback module 315. In some implementations, web proxy 310 may rename the obtained files, in order to match the names of the requested files. In some implementations, web proxy 310 may use mapping information (e.g., as shown in data structure 600 of FIG. 6), in order to rename the obtained files to the match the requested files. Content playback module 315 may proceed to play the received files.

Figure 7:
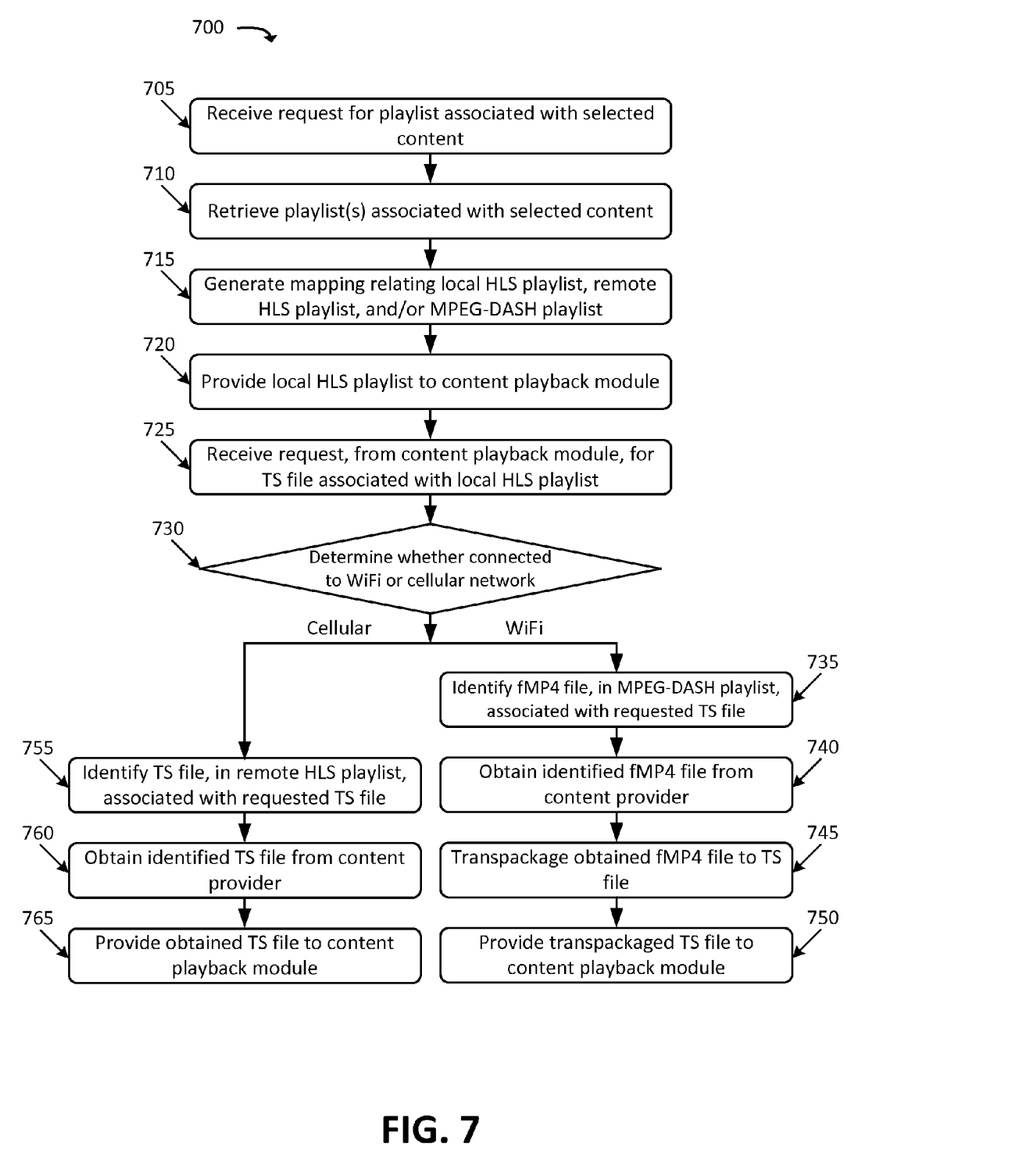
FIGS. 7 and 8 illustrate example processes for selectively obtaining content, using HLS or another technique, based on a type of network to which a user device is connected.

FIG. 7 illustrates an example process 700 for selectively obtaining content, using HLS or another technique (e.g., MPD), based on a type of network to which a user device is connected (e.g., whether the user device is connected to a WiFi network or a cellular network). In some implementations, some or all of process 700 may be performed by user device 205 (e.g., by one or more of components 305-320).

As shown, process 700 may include receiving (at 705) a request for a playlist associated with selected content. For example, as described above with respect to content selection module 305, user device 205 may receive a selection of content, such as video content that a user wishes to access. The selection may include the selection of a hyperlink, and/or another type of input that specifies the desired content. User device 205 may identify resource locator information associated with the selected content (e.g., a URL, hosted by content provider 225, of one or more playlists associated with the content). Also, in some implementations, once the content is playing, requests for playlists may be received (at 705) during the playback of the content.

Process 700 may also include retrieving (at 710) one or more playlists associated with the selected content. For example, as described above with respect to content selection module 305, user device 205 may obtain an HLS playlist (e.g., a remote HLS playlist) and/or an MPD playlist associated with the selected content. That is, in some implementations, content selection module 305 may obtain both playlists based on receiving the selection of the content.

Process 700 may further include generating (at 715) a mapping relating a local HLS playlist, a remote HLS playlist, and/or an MPD playlist. For example, as described above with respect to content selection module 305 and data structure 600, user device 205 may generate a local HLS playlist based on the obtained remote HLS playlist and/or the obtained MPD playlist, and may generate a mapping between the generated local HLS playlist, the remote HLS playlist, and/or the MPD playlist. As mentioned above, the file names of the respective playlists may be different, and the mapping may assist in renaming files if necessary.

Process 700 may additionally include providing (at 720) the local HLS playlist to a content playback module. For example, as described above with respect to content selection module 305, a content playback module (such as content playback module 315, which may be a video player application, such as a native video player application installed with an operating system and/or firmware associated with user device 205). Content playback module 315 may, for example, typically use HLS techniques to obtain streaming content, and/or may not be configured to utilize other techniques.

Process 700 may also include receiving (at 725) a request, from the content playback module, for a file (e.g., a TS file specified in the local HLS playlist) from the content playback module. For example, as described above with respect to web proxy 310, content playback module 315 may provide a request for a particular file specified in the local HLS playlist. The request may be, for example, an HTTP request, which may be handled by web proxy 310. As discussed above, the HTTP request may be a request for which the destination of the request is user device 205 itself (e.g., the HTTP request may include the IP address "127.0.0.1," and a port number that is associated with web proxy 310).

Process 700 may further include determining (at 730) whether the user device is connected to a WiFi network or a cellular network. For example, as described above with respect to content selection module 305 and/or web proxy 310, user device 205 may determine whether user device 205 is connected to cellular network 210 or WiFi network 215.

If the user device is connected to a WiFi network, process 700 may include identifying (at 735) a file (e.g., an fMP4 file), in the MPD playlist, that is associated with the requested file. For example, as described above with respect to web proxy 310, user device 205 may identify a file (e.g., an fMP4 file) in the MPD playlist (e.g., as retrieved at 710) that corresponds to the file (e.g., a TS file) requested (at 725) by content playback module 315. In some implementations, user device 205 may use mapping information, such as the example data structure 600 shown in FIG. 6, in order to determine which file(s) in the MPD playlist corresponds to the requested file.

Process 700 may additionally include obtaining (at 740) the identified file from the content provider. For example, as described above with respect to web proxy 310, user device 205 may obtain the file (identified at 735) from content provider 225.

Process 700 may also include transpackaging (at 745) the obtained file. For example, as described above with respect to transpackaging module 320, user device 205 may transpackage the received file from a format, as provided by content provider 225 (e.g., the fMP4 file format), to a format that accords with the request from content playback module 315 (e.g., the TS file format). As mentioned above, in situations where the name of transpackaged file and/or the file obtained from content provider 225 does not match the file name requested by content playback module 315, the transpackaged file may be renamed to match the requested name (e.g., using mapping information, such as data structure 600).

Process 700 may further include providing (at 750) the transpackaged file to the content playback module. For example, the transpackaged file may be provided to content playback module 315, which may play the file.

Returning to block 730, if the user device is connected to a cellular network, process 700 may include identifying (at 755) a file, specified in the remote HLS playlist, that is associated with the requested file. For example, as described above with respect to web proxy 310, user device 205 may use mapping information (e.g., data structure 600) determine a file, specified in the remote HLS playlist, that corresponds to the file (specified in the local HLS playlist) requested by content playback module 315.

Process 700 may additionally include obtaining (at 760) the identified file from the content provider. For example, as described above with respect to web proxy 310, user device 205 may obtain the file (identified at 755) from content provider 225. In some implementations, in situations where the name of the file, obtained from content provider 225, does not match the name of the requested file, web proxy 310 may rename the obtained file (e.g., using mapping information). Process 700 may also include providing (at 765) the obtained file to the content playback module, which may play the file.

Figure 8:
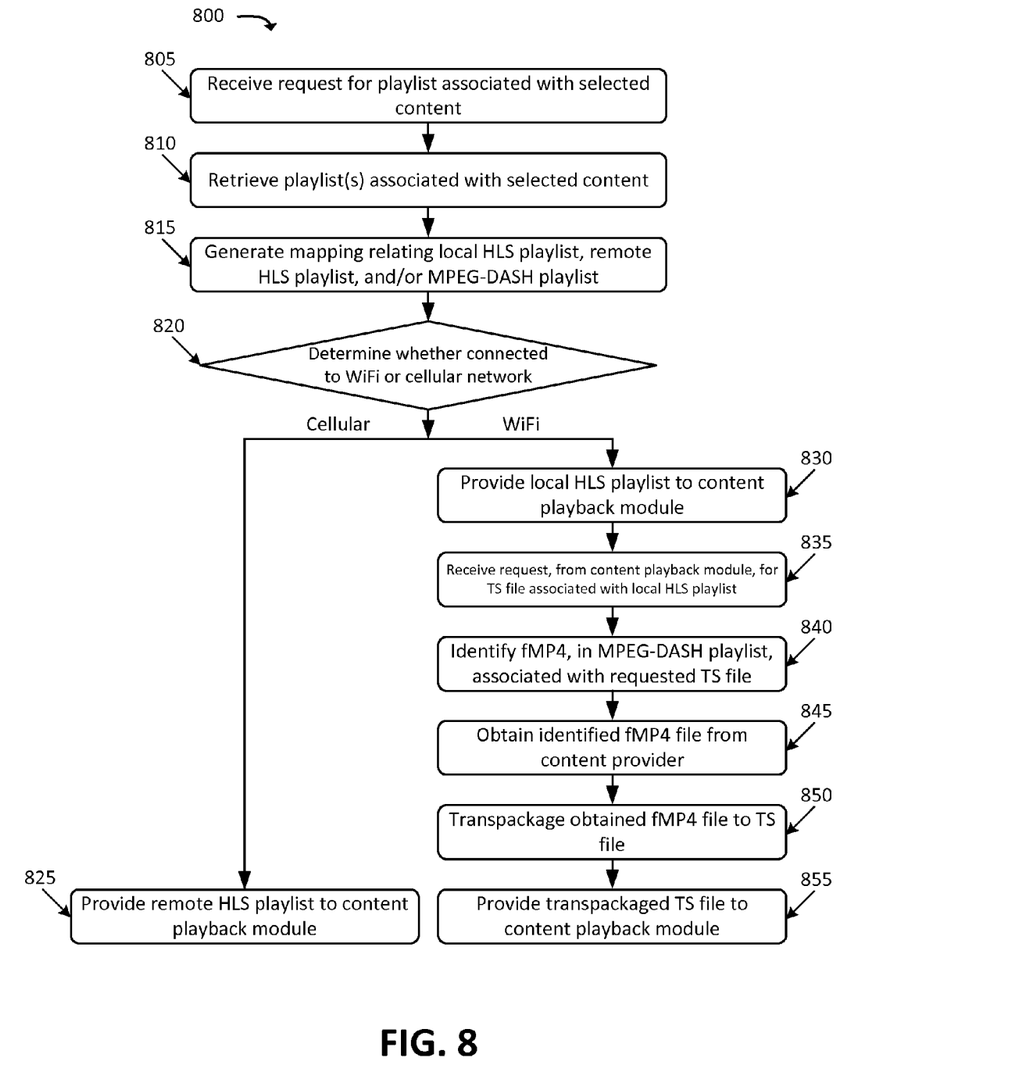

FIG. 8 illustrates another example process 800 for selectively obtaining content, using HLS or another technique (e.g., MPD), based on a type of network to which a user device is connected (e.g., whether the user device is connected to a WiFi network or a cellular network). Process 800 is not necessarily mutually exclusive with process 700. That is, in some implementations, a device (e.g., user device 205) may at certain times operate according to process 700, while at other times operate according to process 800. In other implementations, user device 205 may be configured to operate only according to process 700 (and not process 800), while in still other implementations, user device 205 may be configured to operate only according to process 800 (and not process 700). In one or more implementations, user device 205 may be configured to operate according to a process that is similar to processes 700 and/or 800. Certain blocks of process 800 are similar to blocks of process 700 and, for the sake of brevity, will not be explained in detail below.

As shown, process 800 may include receiving (at 805), a request for a playlist associated with selected content, retrieving (at 810) one or more playlists associated with the content, and generating (at 815) a mapping relating two or more of the retrieved playlists (e.g., relating a local HLS playlist, a remote HLS playlist, and/or an MPD playlist).

Process 800 may further include determining (at 820) whether user device 205 is connected to cellular network 210 or WiFi network 215. If user device 205 is connected to cellular network 210, then process 800 may include providing (at 825) the remote HLS playlist to content playback module 315. Content playback module 315 may use the remote HLS playlist to obtain streaming video content from content provider 225.

If, on the other hand, user device 205 is connected to WiFi network 215, then process 800 may include providing (at 830) the local HLS playlist to content playback module 315. Process 800 may further include receiving (at 835) a request, from content playback module 315, for a file specified in the local HLS playlist. For example, web proxy 310 may receive the request from content playback module 315.

Process 800 may additionally include identifying (at 840) a file (e.g., an fMP4 file), specified in the MPD playlist, that corresponds to the requested file. For example, user device 205 may use the mapping information, generated at 815, to identify the file specified in the MPD playlist.

Process 800 may also include obtaining (at 845) the identified file (e.g., from content provider 225), transpackaging (at 850) the obtained file, and providing (at 855) the transpackaged file to content playback module 315.

Figure 9:
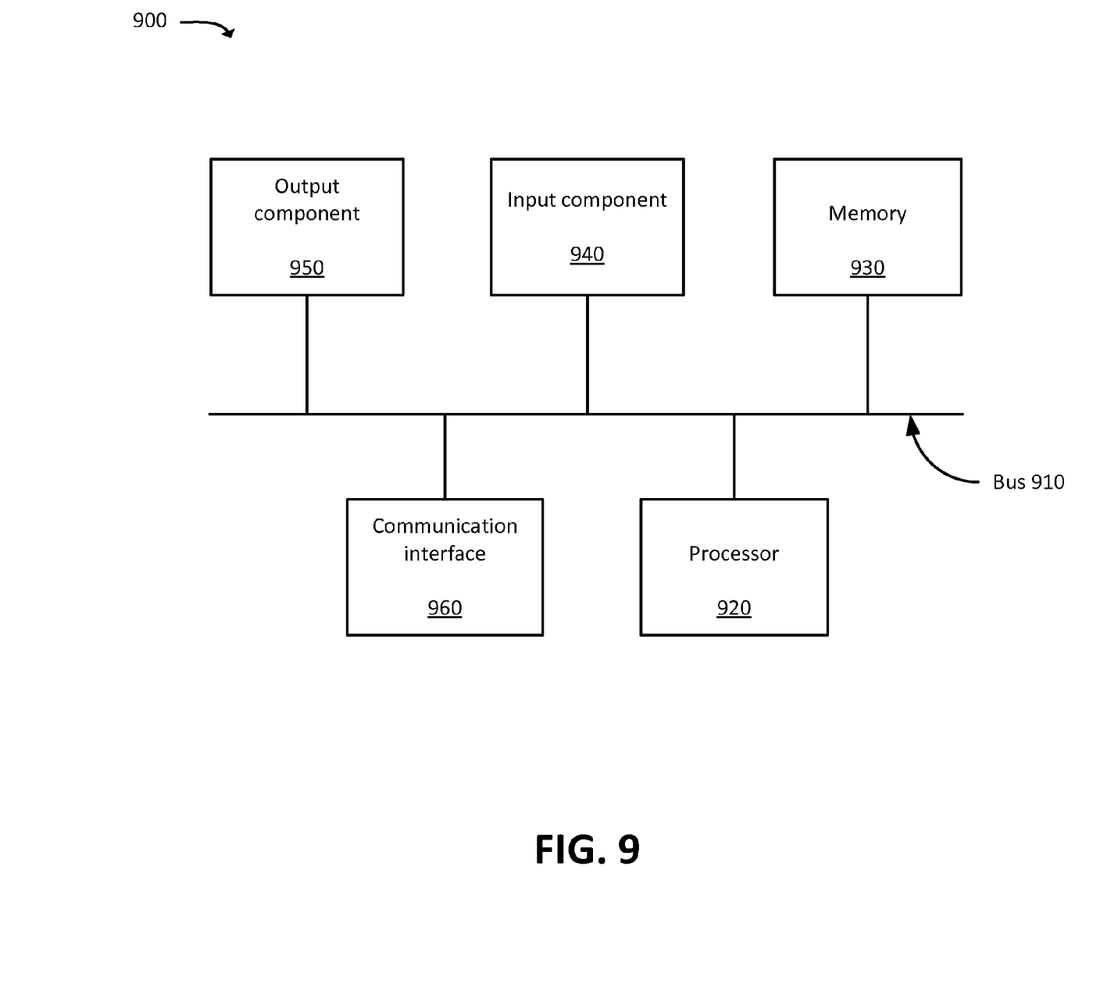
FIG. 9 illustrates example components of a device, in accordance with some implementations described herein.

FIG. 9 is a diagram of example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 3-5, 7, and 8, the order of the blocks and/or signals may be modified in other implementations. Further, non-dependent blocks and/or signals may be performed in parallel.

Also, while described in the context of HLS playlists and MPD playlists, in practice, different types of streaming techniques may be used to practice the concepts described herein. Additionally, while described in the context of TS files and fMP4 files, in practice, different types of files may be used in various implementations. Furthermore, while described in the context of using HLS techniques while connected to cellular networks and MPD techniques while connected to WiFi networks, in practice, different criteria may be used for determining which type of streaming technique should be used. For example, in some implementations, the techniques may be switched (e.g., HLS may be used when connected to WiFi networks, while MPD may be used when connected to cellular networks). As yet another example, a certain technique may be used regardless of what type of network user device 205 is connected to (e.g., MPD techniques may be used, including the use of a local HLS playlist and a mapping to an MPD playlist).

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A user device, comprising:
a memory device storing a set of processor-executable instructions; and
a processor configured to execute the processor-executable instructions, wherein executing the processor-executable instructions causes the user device to:
receive a first playlist and a second playlist associated with a streaming content item,
the first playlist being associated with a first streaming protocol and the second playlist being associated with a second streaming protocol that is different from the first streaming protocol,
the first and second playlists each specifying a list of files associated with segments of the streaming content item;
generate a third playlist based on at least one of the first playlist or the second playlist, the third playlist specifying a plurality of files that have resource locators that are local to the user device,
each file, of the plurality of files specified in the third playlist, corresponding to one or more files in the first playlist or the second playlist;
provide the third playlist to a content playback application, associated with the user device;
receive, from the content playback application, a request for a particular file in the third playlist;
identify whether the user device is connected to a first type of network or a second type of network; and
select which streaming protocol, of the first and second streaming protocols, to use to obtain the streaming content item, the selecting being performed based on which type of network, of the first or second types of networks to which the user device is connected;
obtain the streaming content using the selected streaming protocol,
wherein the processor-executable instructions to obtain the streaming content item cause the user device to:
when the user device is connected to the first type of network, obtain the streaming content item using the first streaming protocol, wherein using the first streaming protocol includes:
identifying, in the first playlist, a first file that corresponds to the requested particular file in the third playlist,
obtaining, via the first type of network, the first file from a content provider that hosts the first file, and
providing the first file to the content playback application, and
when the user device is connected to the second type of network, obtain the streaming content item using the second streaming protocol, wherein using the second streaming protocol includes:
identifying, in the second playlist, a second file that corresponds to the requested particular file, wherein the second file is a different file format than the requested particular file in the third playlist,
obtaining, via the second type of network, the second file from a content provider that hosts the second file,
modifying the second file to a same file format as the requested particular file, and
providing the modified second file to the content playback application.

2. The user device of claim 1, wherein the first type of network is a wireless wide area network, and wherein the second type of network is a wireless local area network.

3. The user device of claim 1, wherein the first file is the same file format as the requested particular file.

4. The user device of claim 1, wherein the third playlist is associated with the first streaming protocol.

5. The user device of claim 4, wherein the first streaming protocol is a Hypertext Transfer Protocol Live Streaming ("HLS") streaming protocol.

6. The user device of claim 5, wherein the second streaming protocol is a Moving Pictures Experts Group Dynamic Streaming over Hypertext Transfer Protocol ("MPEG-DASH") streaming protocol.

7. The user device of claim 1, wherein the resource locators, associated with the plurality of files specified in the third playlist, include an Internet Protocol ("IP") address associated with the user device.

8. The user device of claim 7, wherein the IP address includes the string "127.0.0.1".

9. The user device of claim 1, wherein the request for the particular file is received, from the content playback application, by a local web proxy associated with the user device.

10. The user device of claim 9, wherein the request for the particular file is made by the content playback application via a Hypertext Transfer Protocol ("HTTP") message.

11. A method, comprising:
receiving, by a user device, a first playlist and a second playlist associated with a streaming content item,
the first playlist being associated with a first streaming protocol and the second playlist being associated with a second streaming protocol that is different from the first streaming protocol,
the first and second playlists each specifying a list of files associated with segments of the streaming content item;
generating a third playlist based on at least one of the first playlist or the second playlist, the third playlist specifying a plurality of files that have resource locators that are local to the user device,
each file, of the plurality of files specified in the third playlist, corresponding to one or more files in the first playlist or the second playlist;
providing the third playlist to a content playback application, associated with the user device;
receiving, from the content playback application, a request for a particular file in the third playlist;
identifying whether the user device is connected to a first type of network or a second type of network; and
selecting which streaming protocol, of the first and second streaming protocol, to use to obtain the streaming content item, the selecting being performed based on which type of network, of the first or second types of networks, to which the user device is connected;
obtaining the streaming content using the selected streaming protocol, wherein obtaining the streaming content includes:
when the user device is connected to the first type of network:
identifying, in the first playlist, a first file that corresponds to the requested particular file in the third playlist,
obtaining, via the first type of network and using the first streaming protocol, the first file from a content provider that hosts the first file, and
providing the first file to the content playback application; and when the user device is connected to the second type of network:
    identifying, in the second playlist, a second file that corresponds to the requested particular file in the third playlist, wherein the second file is a different file format than the requested particular file,
    obtaining, via the second type of network and using the second streaming protocol, the second file from a content provider that hosts the second file;
    transpackaging the second file to a same file format as the requested particular file, and
    providing the transpackaged second file to the content playback application.

12. The method of claim 11, wherein the first type of network is a wireless wide area network, and wherein the second type of network is a wireless local area network.

13. The method of claim 11, wherein the first and third playlists are playlists according to the first streaming protocol.

14. The method of claim 13, wherein the first streaming protocol is a Hypertext Transfer Protocol Live Streaming ("HLS") streaming protocol, and wherein the second streaming protocol is a Moving Pictures Experts Group Dynamic Streaming over Hypertext Transfer Protocol ("MPEG-DASH") streaming protocol.

15. The method of claim 11, wherein the resource locators, associated with the plurality of files specified in the third playlist, include an Internet Protocol ("IP") address associated with the user device.

16. The method of claim 11, wherein the request for the particular file is received, from the content playback application, by a local web proxy associated with the user device.

17. The method of claim 11, further comprising:
    renaming the transpackaged second file to match a name of the requested particular file,
    wherein providing the transpackaged second file includes providing the renamed transpackaged second file to the content playback application.

18. A user device, comprising:
    a memory device storing a set of processor-executable instructions; and
    a processor configured to execute the processor-executable instructions, wherein executing the processor-executable instructions causes the user device to:
        receive, from a content playback application associated with the user device, a request for a first file, that corresponds to a segment of streaming content, the request being associated with a first streaming protocol that includes a Hypertext Transfer Protocol Live Streaming ("HLS") protocol;
        identify whether the user device is connected to a first network or a second network that is different from the first network;
        obtain the segment of streaming content using the first protocol when the user device is connected to the first network, and obtain the segment of streaming content using a different second protocol, that is different from the first streaming protocol, when the user device is connected to the second network,
        wherein the processor-executable instructions to obtain the segment of streaming content using the second protocol cause the user device to:
            identify a second file associated with the first file, the second file being associated with the second streaming protocol;
            obtain, using the second streaming protocol, the second file from a content provider;
            modify the obtained second file to a file format associated with the HLS streaming protocol; and
            provide the modified second file to the content playback application, in response to the request for the first file; and
        wherein the processor-executable instructions to obtain the segment of streaming content using the first protocol cause the user device to:
            obtain the requested first file from the content provider, using the HLS streaming protocol; and
            provide the obtained first file to the content playback application, in response to the request for the first file.

19. The user device of claim 18, wherein the second streaming protocol is a Moving Pictures Experts Group Dynamic Streaming over Hypertext Transfer Protocol ("MPEG-DASH") streaming protocol.

20. The user device of claim 18, wherein the first file is a Moving Pictures Experts Group Transport Stream ("MPEG-TS") file, and wherein the second file is a Fragmented MPEG-4 ("fMP4") file.

* * * * *